United States Patent
Oyman

(10) Patent No.: US 10,110,652 B2
(45) Date of Patent: Oct. 23, 2018

(54) CARRIAGE OF MEDIA CONTENT QUALITY INFORMATION

(71) Applicant: INTEL IP CORPORATION, Santa Clara, CA (US)

(72) Inventor: Ozgur Oyman, San Jose, CA (US)

(73) Assignee: Intel IP Corporation, Santa Clara, UT (US)

( * ) Notice: Subject to any disclaimer, the term of this patent is extended or adjusted under 35 U.S.C. 154(b) by 436 days.

(21) Appl. No.: 14/701,380

(22) Filed: Apr. 30, 2015

(65) Prior Publication Data
US 2016/0105478 A1   Apr. 14, 2016

Related U.S. Application Data

(60) Provisional application No. 62/063,845, filed on Oct. 14, 2014.

(51) Int. Cl.
H04L 29/06       (2006.01)
H04L 29/08       (2006.01)
(Continued)

(52) U.S. Cl.
CPC .......... H04L 65/602 (2013.01); H04L 65/607 (2013.01); H04L 65/80 (2013.01);
(Continued)

(58) Field of Classification Search
CPC ...... H04L 65/602; H04L 65/607; H04L 65/80
(Continued)

(56) References Cited

U.S. PATENT DOCUMENTS 6,366,314 B1 *  4/2002  Goudezeune ........ H04N 17/004
                                                 348/192
2008/0031151 A1 *  2/2008  Williams ............ H04L 41/5009
                                                 370/252
(Continued)

FOREIGN PATENT DOCUMENTS

EP         2093911 A2     8/2009

OTHER PUBLICATIONS

Motion Imagery Standards Board Standard 1402, MPEG-2 Transport of Compressed Motion Imagery and Metadata (MISB ST 1402), Feb. 27, 2014 (13 pages).*
(Continued)

*Primary Examiner* — Wing F Chan
*Assistant Examiner* — Leon Y Tseng
(74) *Attorney, Agent, or Firm* — Thorpe North & Western

(57) ABSTRACT

Technology for communicating Moving Picture Experts Group (MPEG)-2 streaming video quality information is disclosed. A network element can generate quality access units that are associated with one or more media access units in a media content stream representation. The quality access units can indicate quality metadata for the media access units in the media content stream representation. The network element can encapsulate the quality access units in an MPEG-2 transport stream (TS). The network element can generate a quality extension descriptor that describes the quality metadata indicated in the quality access units. The network element can communicate, to a user equipment (UE), the quality extension descriptor according to a defined periodicity. The network element can communicate, to the UE, the quality access units in the MPEG TS with the media access units, wherein the quality access units are interpreted at the UE based on the quality extension descriptor.

21 Claims, 12 Drawing Sheets

(51) Int. Cl.
    H04N 21/235    (2011.01)
    H04N 21/647    (2011.01)
    H04N 21/84     (2011.01)
(52) U.S. Cl.
    CPC ......... H04L 67/06 (2013.01); H04N 21/2353 (2013.01); H04N 21/647 (2013.01); H04N 21/84 (2013.01)
(58) Field of Classification Search
    USPC .................................................. 709/217, 231
    See application file for complete search history.

(56) References Cited

U.S. PATENT DOCUMENTS

| | | | | |
|---|---|---|---|---|
| 2013/0124749 A1* | 5/2013 | Thang | ................ | H04L 65/4092 709/231 |
| 2014/0201795 A1* | 7/2014 | Huber | ................ | H04L 65/4076 725/110 |
| 2014/0317308 A1* | 10/2014 | Zhang | ................ | H04L 65/4069 709/231 |
| 2015/0026358 A1 | 1/2015 | Zhang et al. | | |

OTHER PUBLICATIONS

Gellens, et al; IETF RFC 6381, The 'Codecs' and 'Profiles' Parameters for "Bucket" Media Types, Aug. 2011.

ISO/IEC JTC 1/SC 29/WG 11: Information technology—MPEG systems technologies—Part 10: Carriage of Timed Metadata Metrics of Media in ISO Base Media File Format; Jul. 18, 2014.

ISO/IEC 13818-1: Information technology—Generic coding of moving pictures and associated audio information: Systems; Fifth edition; Jul. 11, 2014.

ISO/IEC 14496-10: Information technology—Coding of audio-visual objects—Part 10: Advanced Video Coding; Seventh edition; May 1, 2012.

ITU-T Recommendation; J.144: Objective perceptual video quality measurement techniques for digital cable television in the presence of a full reference; (Mar. 2001).

ITU-T Recommendation; J.247: Objective perceptual multimeda video quality measurement in the presence of a full reference; (Aug. 2008).

ISR for PCT/US2015/050025 dated Dec. 11, 2015.

Z. Wang, et al.; Multi-Scale Structural Similarity for Image Quality Assessment; The Thirty-Seventh Asilomar Conference on Signals, Systems & Computers; 2003.

Z. Li et al.; Rate-Distortion Optimal Video Summary Generation; in IEEE Transactions on Image Processing; Oct. 2005.

Z. Wang, et al.; Image Quality Assessment: From Error Visibility to Structural Similarity; in IEEE Transactions on Image Processing; Apr. 2004.

S. Zhang; Metadata Signalling for DASH using Index Files; ISO/IEC JTC1/SC29/2G11; Jul. 2013; Vienna, Austria.

ISO/IEC DIS 23001-11; Information Technology—MPEG Systems Technologies—Part 11: Energy-Efficient Media consumption (Green Metadata); Apr. 26, 2013.

K. Seshadrinathant et al.; A Subjective Study to Evaluate Video Quality Assessment Algorithms; IS&T/SPIE Electronic Imaging. International Society for Optics and Photonics, 2010.

Z. Li, et al.; Light Weight Content Fingerprinting for Video Playback Verification in MPEG DASH; Proceedings of IEEE PacketVideo, San Jose 2013.

* cited by examiner

| Value | Description |
|---|---|
| 0x00 | program_association_section |
| 0x01 | conditional_access_section (CA_section) |
| 0x02 | TS_program_map_section |
| 0x03 | TS_description_section |
| 0x04 | ISO_IEC_14496_scene_description_section |
| 0x05 | ISO_IEC_14496_object_descriptor_section |
| 0x06 | Metadata_section |
| 0x07 | IPMP_Control_Information section (defined in ISO/IEC 13818-11) |
| 0x08 | ISO_IEC_14496_section |
| 0x09 | ISO/IEC 23001-11 (Green Access Unit) section |
| 0x0A | ISO/IEC 23001-10 (Quality Access Unit) section |
| 0x0B-0x37 | Rec. ITU-T H.222.0 | ISO/IEC 13818-1 reserved |
| 0x38-0x3F | Defined in ISO/IEC 13818-6 |
| 0x40-0xFE | User private |
| 0xFF | Forbidden |

FIG. 5

| Syntax | No. of bits | Mnemonic |
|---|---|---|
| Extension_descriptor () { | | |
|     descriptor_tag | 8 | uimsbf |
|     descriptor_length | 8 | uimsbf |
|     extension_descriptor_tag | 8 | uimsbf |
|     if ( extension_descriptor_tag == 0x02) { | | |
|         ObjectDescriptorUpdate() | | |
|     } | | |
|     else if ( extension_descriptor_tag == 0x03) { | | |
|         HEVC_timing_and_HRD_descriptor() | | |
|     } | | |
|     else if ( extension_descriptor_tag == 0x04) { | | |
|         af_extension_descriptor() | | |
|     } | | |
|     else if ( extension_descriptor_tag == 0x05) { | | |
|         HEVC_extension_descriptor() | | |
|     } | | |
|     else if ( extension_descriptor_tag == 0x06) { | | |
|         HEVC_operation_point_descriptor() | | |
|     } | | |
|     else if ( extension_descriptor_tag == 0x07) { | | |
|         hierachy_extension_descriptor() | | |
|     } | | |
|     else if ( extension_descriptor_tag == 0x08) { | | |
|         Green_extension_descriptor () | | |
|     } | | |
|     else if ( extension_descriptor_tag == 0x09) { | | |
|         Quality_extension_descriptor () | | |
|     } | | |
|     else { | | |
|         for ( i=0; i<N; i++ ) { | | |
|             reserved | 8 | bslbf |
|         } | | |
|     } | | |
| } | | |

FIG. 6

| Extension_descriptor_tag | TS | PS | Identification |
|---|---|---|---|
| 0 | n/a | n/a | Reserved |
| 1 | n/a | X | Forbidden |
| 2 | X | X | ODUpdate_descriptor |
| 3 | X | n/a | HEVC_timing_and_HRD_descriptor() |
| 4 | | | af_extensions_descriptor() |
| 5 | X | n/a | HEVC_extension_descriptor() |
| 6 | X | n/a | HEVC_operation_point_descriptor() |
| 7 | X | n/a | hierarchy_extension_descriptor() |
| 8 | X | n/a | Green_extension_descriptor() |
| 9 | X | n/a | Quality_extension_descriptor() |
| 10-255 | n/a | n/a | Rec. ITU-T H.222.0 | ISO/IEC 13818-1 Reserved |

FIG. 7

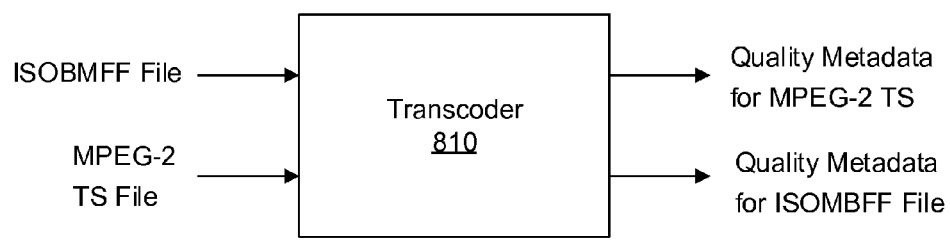

FIG. 8

```
<?xml version="1.0" encoding="UTF-8"?>
<MPD
  xmlns:xsi="http://www.w3.org/2001/XMLSchema-instance"
  xmlns="urn:mpeg:dash:schema:mpd:2011"
  xsi:schemaLocation="urn:mpeg:dash:schema:mpd:2011 DASH-MPD.xsd"
  type="static"
  mediaPresentationDuration="PT6158S"
  availabilityStartTime="2011-05-10T06:16:42"
  minBufferTime="PT1.4S"
  profiles="urn:mpeg:dash:profile:mp2t-simple:2011"
  maxSegmentDuration="PT4S">

<BaseURL>http://cdn1.example.com/</BaseURL>
  <BaseURL>http://cdn2.example.com/</BaseURL>

<Period id="42" duration="PT6158S">
    <AdaptationSet
      mimeType="video/mp2t"
      codecs="avc1.4D401F,mp4a,vqme.psnr"
      frameRate="24000/1001"
      segmentAlignment="true"
      subsegmentAlignment="true"
      bitstreamSwitching="true"
      startWithSAP="2"
      subsegmentStartsWithSAP="2">
      <ContentComponent contentType="video" id="481"/>
      <ContentComponent contentType="audio" id="482" lang="en"/>
      <ContentComponent contentType="audio" id="483" lang="es"/>
      <BaseURL>SomeMovie/</BaseURL>
      <SegmentTemplate
         media="$RepresentationID$_$Number%05d$.ts"
         index="$RepresentationID$.sidx"
         initialization="$RepresentationID$-init.ts"
         bitstreamSwitching="$RepresentationID$-bssw.ts"
         duration="4"/>
      <Representation id="720kbps" bandwidth="792000" width="640"
height="368"/>
      <Representation id="1130kbps" bandwidth="1243000" width="704"
height="400"/>
      <Representation id="1400kbps" bandwidth="1540000" width="960"
height="544"/>
      <Representation id="2100kbps" bandwidth="2310000" width="1120"
height="640"/>
      <Representation id="2700kbps" bandwidth="2970000" width="1280"
height="720"/>
      <Representation id="3400kbps" bandwidth="3740000" width="1280"
height="720"/>
    </AdaptationSet>
  </Period>
</MPD>
```

FIG. 9

CARRIAGE OF MEDIA CONTENT QUALITY INFORMATION

RELATED APPLICATIONS

The present application claims priority to U.S. Provisional Patent Application No. 62/063,845, filed Oct. 14, 2014, the entire specification of which is hereby incorporated by reference in its entirety for all purposes.

BACKGROUND

The growth of multimedia services, including streaming and conversational services, is one of the key drivers of the evolution to new mobile broadband technologies and standards. Digital video content is increasingly consumed in mobile devices. There are many video applications extensively used on mobile devices in daily life. For example, online video streaming include popular services such as YouTube and Hulu. Video recording and video conferencing include services such as Skype and Google Hangout. In 2011, YouTube had more than 1 trillion global views. Ten percent of the views were accessed via mobile phones or tablets. As more smart phones, tablets, and other mobile computing devices are purchased, their use for video recording and video conferencing will increase dramatically. With such high consumer demand for multimedia services coupled with developments in media compression and wireless network infrastructures, it is of interest to enhance the multimedia service capabilities of future cellular and mobile broadband systems and deliver high quality of experience (QoE) to the consumers, thereby ensuring ubiquitous access to video content and services from any location, at any time, with any device and technology.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 5 is a table of identifier (ID) assignment values in accordance with an example;

FIG. 6 is a table of extension descriptors in accordance with an example;

FIG. 7 is a table of extension descriptor tag values in accordance with an example;

FIG. 8 illustrates a transcoder configured to receive an International Organization for Standardization (ISO) base media file format (ISOBMFF) file or an MPEG-2 TS file as input and provide quality metadata for MPEG-2 TS or quality metadata for an ISOBMFF file as an output in accordance with an example;

FIG. 9 illustrates an abstract syntax notation (ASN) code example of a dynamic adaptive streaming over hypertext transfer protocol (DASH) media presentation description (MPD) file in which a carriage of quality information based on a an Moving Picture Experts Group (MPEG)-2 transport stream (TS) format is signaled via a codecs parameter in accordance with an example;

Figure 1:
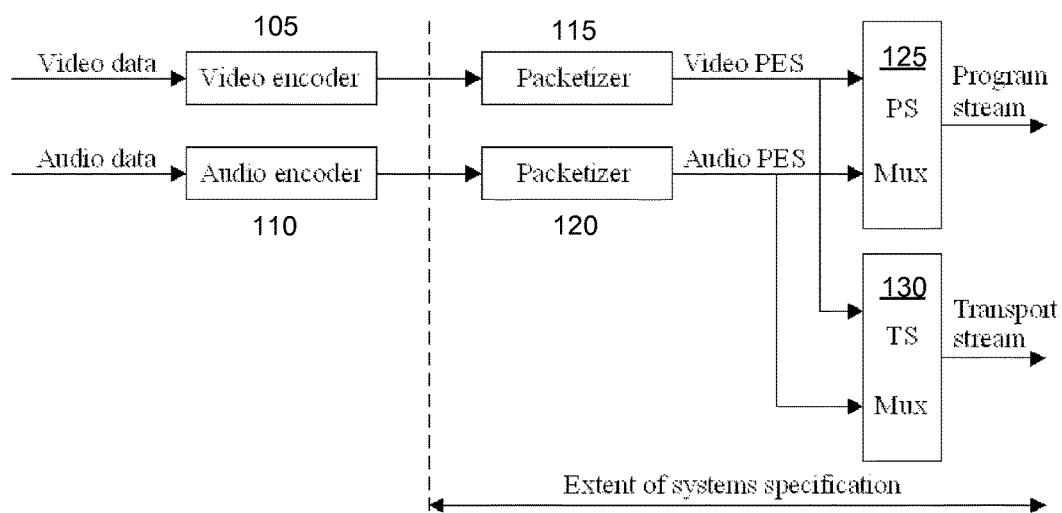
FIG. 1 illustrates an Moving Picture Experts Group (MPEG)-2 transport stream (TS) format in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A technology is described for communicating Moving Picture Experts Group (MPEG)-2 streaming video quality information. A network element can generate quality access units that are associated with one or more media access units in a media content stream representation. The media access units can be media content frames (e.g., video frames) in the media content stream representation. The quality access units can indicate quality metadata (e.g., quality metrics) for the media access units in the media content stream representation. In other words, each quality access unit can indicate quality metadata for one or more media access units (or media content frames). The network can encapsulate the quality access units in a Moving Picture Experts Group (MPEG)-2 transport stream (TS). The network element can generate a quality extension descriptor that describes the quality metadata indicated in the quality access units. The network element can communicate the quality extension descriptor in a program map table (PMT) to a user equipment (UE) according to a defined periodicity (e.g., approximately every 100 milliseconds). In addition, the network element can communicate the quality access units in the MPEG TS to the UE. The quality access units can be communicated to the UE with the media access units in the media content stream representation. The UE can parse and decode the MPEG TS using the quality extension descriptor in order to extract the quality access units (and the quality metadata). The UE can present, via a media player that is executing at the UE, the media access units based on the quality metadata included in the quality access units. In other words, the UE can utilize the quality metadata in the MPEG-2 TS to intelligently stream the media access units in the media content stream representation.

There have been a number of multimedia standards that have been developed to enable multimedia to be communicated to, from, or between computing devices. For instance, in streaming video, the third generation partnership project (3GPP) has developed technical specification (TS) 26.234 (e.g. Release 11.0.0) that describes packet-switched streaming services (PSS) that are based on the real-time streaming protocol (RTSP) for unicast streaming of on-demand or live content. In addition, hyper-text transfer protocol (HTTP) based streaming services, including progressive download and dynamic adaptive streaming over HTTP (DASH), are described in 3GPP TS 26.247 (e.g. Release 11.0.0). 3GPP-based multimedia broadcast and multicast services (MBMS) specification TS 26.346 (e.g. Release 11.0.0) specifies streaming and download techniques for multicast/broadcast content distribution. As such, DASH/PSS/MBMS-based mobile computing devices, such as user equipment (UEs), decode and render streamed videos at the UE devices. Support for the 3GPP file format in 3GPP TS 26.244 (e.g. Release 11.0.0) is mandated in all of these specifications to support file download and HTTP-based streaming use cases.

Multimedia streaming in a high mobility environment can be challenging when fluctuations in network conditions (i.e., network variability) decreases a communication data rate associated with the multimedia content. When an overloaded network causes the communication data rate to decrease, an end user quality of experience (QoE) can decrease as well. For example, the multimedia content received at the mobile device can be of less resolution or quality and/or the multimedia content can periodically break or pause when being provided over the overloaded network.

Multimedia content that is streamed to a client, such as a user equipment (UE), can include a plurality of multimedia content segments. The multimedia content segments can each contain different encoded versions that represent different qualities levels of the multimedia content. The different encoded versions can allow the client to seamlessly adapt to changing network conditions. For example, when the network conditions are good (i.e., the network conditions are above a predetermined threshold), the client can request multimedia content segments that are of a higher video quality. When the network conditions are poor (i.e., the network conditions are below a predetermined threshold), the client can request multimedia content segments that are of a lower video quality. As a result, the client may still be able to receive the multimedia content segments (albeit at a lower quality) when the network conditions are poor and a likelihood of the adaptive media stream being interrupted can be reduced.

Some media streaming technologies, such as DASH, currently support the inclusion of timed metadata. The timed metadata can be periodically included in a media content stream that is provided to the client. Examples of timed metadata include quality information and indicators for power reduction. The quality information in the timed metadata can enable the client to achieve smoother quality streaming and reduced bandwidth consumption. In one example, the client can use the quality information (or quality metadata) to intelligently select which encoded version of the media content is to be received at the client in order to maximize streaming quality and bandwidth consumption. The quality metadata can be associated with media content segments that are being received at the client.

The quality metadata can dynamically indicate a quality level for the media content segments. In one example, if the quality metadata indicates that the quality level for the media content segments is relatively low (e.g., the video is grainy), the client can request media content segments of an increased quality level (albeit at a higher bitrate). In another example, if the quality metadata indicates that the quality level for the media content segments is relatively high, the client can request media content segments at a slightly lower quality level (which can result in a reduced bitrate), such that the reduced quality level is not substantially noticeable to the client's user. In other words, if a reduction of quality is not noticeable to the user, then media content segments at a reduced quality level can be selected in order to save bandwidth. As previously stated, the quality metadata provided to the client can enable the client to intelligently request the media content segments for playback.

The Moving Picture Experts Group (MPEG)-2 transport stream (TS) is a media format that is deployed in a number of systems (e.g., broadcast systems), such as digital video broadcasting (DVB) and Advanced Television Systems Committee (ATSC). In previous solutions, the MPEG2-TS format does not support the carriage of video quality metrics and associated metadata. As a result, traditional systems based on MPEG2-TS formats (e.g., broadcasts) cannot realize the benefits of quality-driven adaptive streaming. In addition, during transcoding operations, it was previously not possible to translate quality information due to lack of support in the MPEG2-TS format. An example of a transcoding operation can include transcoding from an International Organization for Standardization (ISO) base media file format (ISOBMFF) to the MPEG2-TS file format, or vice versa.

The technology described herein relates to the carriage of video quality metadata in the MPEG2-TS media file format. As a result, the benefits of quality-driven adaptive streaming can be applied to MPEG2-TS systems. In addition, the translation of quality information during transcoding operations (e.g., from ISOBMFF to MPEG2-TS, or vice versa) can be enabled with the present technology.

FIG. 1 illustrates an exemplary Moving Picture Experts Group (MPEG)-2 transport stream (TS) format. Video data can be provided to a video encoder 105. The video encoder 105 can produce encoded video data, which is then provided to a first packetizer 115. The first packetizer 115 can generate video Packetized Elementary Stream (PES) packets from the encoded video data. In addition, audio data can be provided to an audio encoder 110. The audio encoder 110 can produce encoded audio data, which is then provided to a second packetizer 120. The second packetizer 120 can generate audio Packetized Elementary Stream (PES) packets from the encoded audio data. In one example, the video PES packets and the audio PES packets can be provided to a program stream (PS) multiplexer 125, which generates a program stream to include the video PES packets and the audio PES packets. In another example, the video PES packets and the audio PES packets can be provided to a transport stream (TS) multiplexer 130, which generates a transport stream to include the video PES packets and the audio PES packets.

The MPEG-2 TS is a standard container format that is used for the transmission and storage of audio, video and Program and System Information (PSIP) data. The container format (or wrapper format) can describe how different elements of data and metadata coexist in a computer file. In one example, the MEPG-2 TS can include metadata (e.g., quality metadata) that describes the audio/video. The MPEG-2 TS can be used in broadcast systems, such as DVB, ATSC, and Internet Protocol Television (IPTV). The MPEG-2 TS is further defined in MPEG-2 Part 1, Systems (formally known as ISO/IEC standard 13818-1 or ITU-T Rec. H.222.0). The IEC is also referred to as the International Electrotechnical Commission. The MPEG-2 TS can specify the container format for encapsulating the packetized elementary streams (with error correction), as well as stream synchronization features for maintaining transmission integrity when the signal is degraded. The transport stream can differ from the program stream in several ways. The program stream is designed for reasonably reliable media, such as discs (e.g., DVDs), while the transport stream is designed for less reliable transmission, such as terrestrial or satellite broadcast. In addition, the transport stream can carry multiple programs.

The MPEG-2 transport stream can include program-specific information (PSI), which is metadata about a certain program (or channel). One example of PSI is a program map table (PMT). The PMT can include information about programs. For instance, a transport stream used in digital television might contain three programs to represent the three television channels. The three programs (or channels) can be described by three PMTs. Each channel can include one video stream, one or two audio streams, and metadata. The PMTs can provide information on each program present in the transport stream, including a program number, and list the elementary streams that are included in the described MPEG-2 program.

Figure 2:
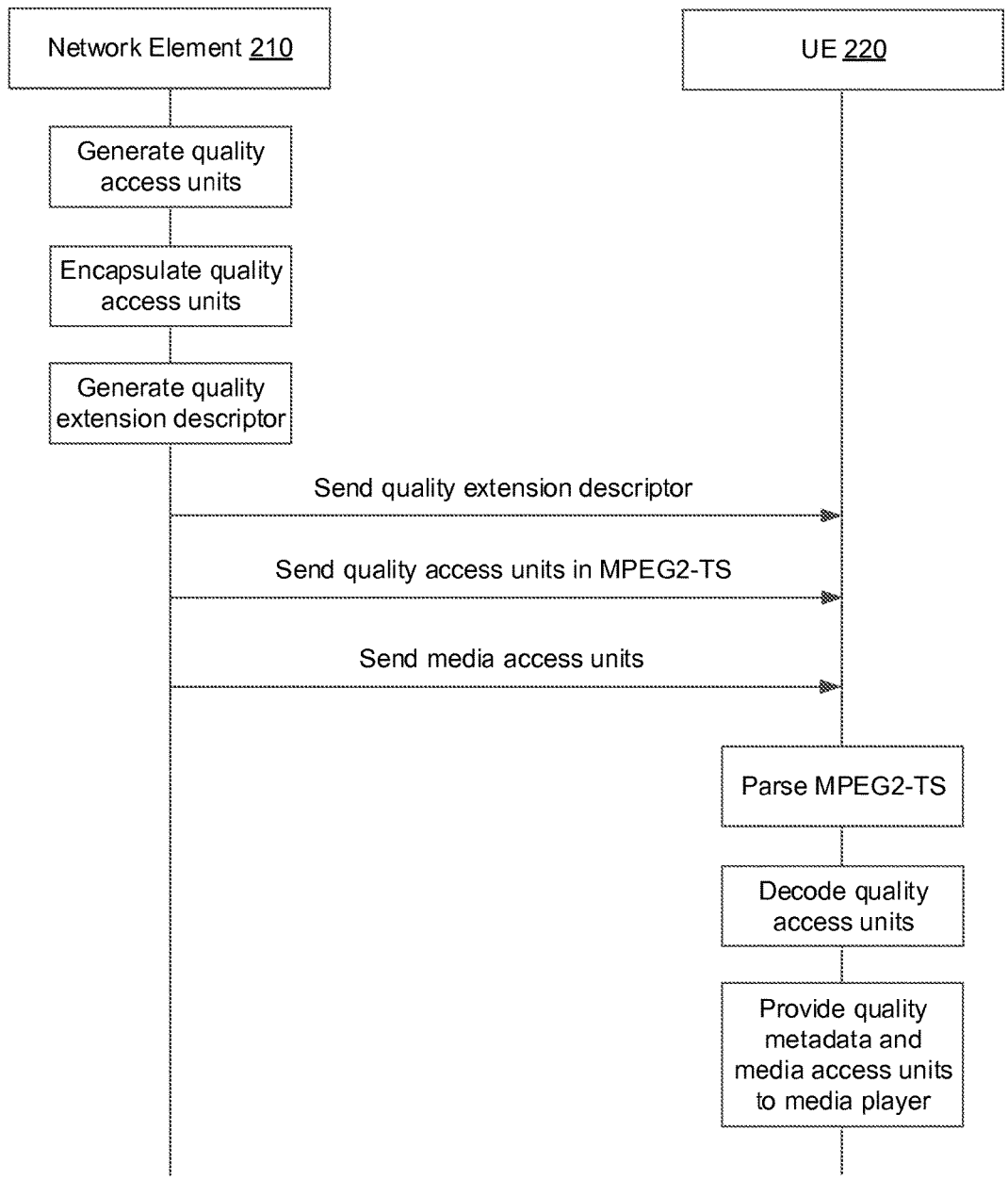
FIG. 2 illustrates signaling between a network element and a user equipment (UE) to communicate Moving Picture Experts Group (MPEG)-2 streaming video quality information in accordance with an example.

FIG. 2 illustrates exemplary signaling between a network element 210 and a user equipment (UE) 220 to communicate Moving Picture Experts Group (MPEG)-2 streaming video quality information. The network element 210 can be located in a content delivery network (CDN) or an operator network. The network element 210 can stream media content to the UE 220. As used herein, the term "media content" can refer to audio and/or video. The network element 210 can send video quality information to the UE 220 along with the media content. The video quality information can describe a quality level for one or more media content frames included in the media content. The video quality information (e.g., quality metadata) can enable the UE 220 to intelligently request media content frames from the network element 210 based on the video quality information. For example, the UE 220 can adapt a media content bitrate, resolution and/or frame rate based on the video quality information received from the network element 210. As a result, the UE 220 can be quality aware when receiving media content in accordance with the MPEG-2 standard.

In one example, the network element 210 can generate quality access units that are associated with one or more media access units (or video frames) in a media content stream representation. The media access units can be media content frames (e.g., video frames) in the media content stream representation. The quality access units can indicate quality metadata for the media access units in the media content stream representation. The quality metadata can include quality metrics for the media access units. As a non-limiting example, a particular quality access unit (with quality metadata) can be associated with a sequence of five media access units (or five media content frames). In general, the quality access units can be dynamic information that reflects variations in the quality levels of the media access units in a timely manner. In other words, since the quality access units can be sent for each media access unit, a change in quality level can be quickly reflected in changed metadata in a subsequent quality access unit.

In one example, the quality access units can be associated with a particular media content stream. Multiple media content streams can be broadcasted by the network element 210 at a given time, so the UE 220 is to know which media content stream corresponds to the quality access units. In addition, the UE 220 is to know which media access unit (or media content frame) is being described by a particular quality access unit. This information can be indicated in the quality access format.

As previously explained, the quality access units can include quality metadata. The quality metrics included in the quality metadata can be objective or subjective criteria used to judge a quality level of the media content frame. In general, media content quality (or video quality) refers to a formal or informal measure of perceived media content degradation between original media content and the media content after its passed through a media content transmission or processing system (e.g., a video encoder). In other words, the quality metric can measure a difference between an original media content signal, which is generally considered to be of high quality (since the original media content signal is not compressed) and the encoded (or otherwise transformed) media content signal. In one example, the quality metrics included in the quality metadata can include a signal-to-noise ratio (SNR), peak signal-to-noise ratio (PNSR), a structural similarity index (SSIM), a multi-scale structural similarity index (MS-SSIM), a video quality metric (VQM), a perceptual evaluation of video quality (PEVQ), a mean opinion score (MOS), a frame significance (FSIG), a Czenakowski Distance (CZD), etc.

In one configuration, a quality access unit is an access unit that contains dynamic quality metadata, as defined in ISO/IEC 23001-10. Therefore, dynamic quality metadata can be stored in access units that are associated with one or more media content frames (e.g., video frames). These access units can be encapsulated in MPEG sections, which are identified by a stream type value of 0x2C. Each quality access unit can contain configuration and timing information, as well as an array of quality metric values. The quality values can have a one-to-one correspondence to the quality metrics. Each quality metric value can be padded by preceded zero bytes, as needed, to the number of bytes indicated by a field size bytes parameter. A quality access unit can be in accordance with the following syntax:

| Syntax | No. Bits | Mnemonic |
|---|---|---|
| Quality_Access_Unit( ) { | | |
|   field_size_bytes | 8 | uimsbf |
|   metric_count | 8 | uimsbf |
|   for ( i = 0; i < metric_count; i++) { | | |
|     metric_code | 32 | uimsbf |
|     sample_count | 8 | uimsbf |
|     for ( j = 0; j < sample_count; j++) { | | |
|       '0010' | 4 | bslbf |
|       media_DTS [32..30] | 3 | uimsbf |

| Syntax | No. Bits | Mnemonic |
|---|---|---|
|         marker_bit | 1 | bslbf |
|         media_DTS [29..15] | 15 | uimsbf |
|         marker_bit | 1 | bslbf |
|         media_DTS [14..0] | 15 | uimsbf |
|         marker_bit | 1 | bslbf |
|         quality_metric_sample | N | |
|       } | | |
|     } | | |
| } | | |

With respect to the syntax of the quality access unit, the field size bytes (or field_size_bytes) parameter can indicate a size of a quality metric sample field. The metric count (or metric_count) parameter can indicate a number of quality metric values in each quality access unit. The metric code (or metric_code) parameter can indicate a code name for quality metric values in the quality access units. The sample count (or sample_count) parameter can indicate a number of quality metric samples per quality metric value. The decoding time stamp (DTS) parameter, or media_DTS, can indicate a DTS of the media access unit that is described by a quality metric sample.

In one example, the network element 210 can encapsulate the quality access units in a Moving Picture Experts Group (MPEG)-2 transport stream (TS). The MPEG-2 TS is a standard container format that is used for the transmission of audio, video and metadata. In other words, the quality access units can be carried in MPEG sections. Each quality access unit can be a random access point. In addition, each quality access unit can be contained in a single transport stream (TS) packet.

In one example, the network element 210 can generate a quality extension descriptor that describes the quality metadata indicated in the quality access units.

The quality extension descriptor can be sent to the UE 220 once per event or program. The quality extension descriptor can be signaled using a descriptor in a program map table (PMT). The PMT is an entity that is periodically sent from the network element 210 to the UE 220. The PMT is an electronic service guide that informs the UE 220 of the media content to be transmitted to the UE 220. This descriptor can appear in an elementary stream loop of the packet identifier (PID) for which the quality information is provided. The quality extension descriptor can describe quality metrics that are present in each quality access unit. The quality extension descriptor can include a constant field size that is used for quality metric values. In other words, the quality extension descriptor can enable the UE 220 to process the quality metadata that is included in the quality access units. The UE 220 might not know how to interpret the quality metadata if the quality extension descriptor is not received from the network element 210, and as a result, the UE 220 might ignore the quality metadata in this scenario (i.e., when the UE 220 does not receive the quality extension descriptor). The quality metrics can be further described in ISO/IEC 23001-10.

In one example, the quality extension descriptor can be in accordance with the following syntax:

| Syntax | No. bits | Mnemonic |
|---|---|---|
| QUALITY_extension_descriptor( ) { | | |
|     descriptor_tag | 8 | Uimsbf |
|     field_size_bytes | 8 | Uimsbf |
|     metric_count | 8 | Uimsbf |
|     for (i=0; i < metric_count; i++) | | |
|         metric_code[i] | 32 | Uimsbf |
| } | | |

With respect to the syntax of the quality extension descriptor, the descriptor tag (or descriptor_tag) parameter can indicate a tag of the quality extension descriptor. The field size bytes (or field_size_bytes) parameter can indicate a constant size (in bytes) for quality metric values in each quality access unit. The metric count (or metric_count) parameter can indicate a number of quality metric values in each quality access unit. The metric code (or metric_code) parameter can indicate a code name for quality metric values in the quality access units. Optionally, the syntax of the quality extension descriptor can include a stream identifier (or stream_id) parameter, which indicates a stream identifier for the media content stream representation that is described by the quality access units. The semantics for these syntax elements are specified in ISO/IEC 23001-10.

In one example, the network element 210 can communicate to the UE 220 the quality extension descriptor in the PMT. The network element 210 can send the quality extension descriptor according to a defined periodicity. In one example, the network element 210 can send the quality extension descriptor approximately every 100 milliseconds (ms). In general, the quality extension descriptor can be more static information that is sent to the UE 220. The UE 220 can interpret a group of media access units (e.g., the media access units received in a 100 ms timeframe) based on the quality extension descriptor. The UE 220 can interpret a subsequent group of access units based on a subsequent quality extension descriptor. The quality extension descriptor can be a general descriptor that is potentially applied to hundreds of quality access units. On the other hand, the quality access units can be more dynamic because they are associated with one or several media content frames (e.g., on the order of tens of milliseconds of video).

The network element 210 can communicate the quality access units in the MPEG TS to the UE 220. In addition, the network element 210 can communicate the media access units in the media content stream representation to the UE 220. In other words, the media access units can be communicated in conjunction with the corresponding quality access units. The MPEG standard describes a packetization format, which applies to the media access units (or video frames) and the quality access units. The media access units and the quality access units are transmitted in band to the UE 220. On the other hand, the quality extension descriptor (which is included in the PMT) is out-of-band information. The quality extension descriptor can be transmitted to the UE 220 separately from the media access units and the quality access units.

In one example, the UE 220 can receive the quality extension descriptor, the media access units, and the quality access units (that is encapsulated in the MPEG-2 TS) from the network element 210. In one example, the UE 220 can receive multiple quality extension descriptors and associated quality access units that correspond to multiple media content stream representations in a single MPEG-2 TS. The UE 220 can parse the MPEG TS in order to extract the quality access units. The UE 220 can decode the quality access units in order to identify the quality metadata included in the quality access units. In one example, the UE 220 can use the quality extension descriptor to parse and decode the MPEG-2 TS in order to extract the quality access units, as well as the quality metadata that is included in the quality access units. In other words, the previous transmission of the quality extension descriptor from the network element 210 can enable the UE 220 to access the quality metadata. The UE 220 may be unable to access the quality metadata if the quality extension descriptor was not previously received from the network element 210. In the scenario when the UE 220 does not have the quality extension descriptor, the UE 220 may simply ignore the quality metadata included in the MPEG-2 TS. In order to maintain backwards compatibility, legacy UEs may ignore the quality metadata, whereas newer UEs that are quality aware may utilize the quality metadata during media content playback.

In one example, the UE 220 can include a demultiplexer to process the MPEG-2 TS. Since the MPEG-2 TS is a multiplexed format, the audio, video, metadata (e.g., quality access units), etc. can be packaged together. In other words, the audio, video and metadata are multiplexed, packetized and transmitted over a medium from the network element 210 to the UE 220. The demultiplexer can identify the audio, the video and the metadata. At this time, the UE 220 can parse and decode the metadata (e.g., the metadata that includes the quality access units) using the quality extension descriptor in order to extract the quality metadata from the metadata.

The UE 220 can provide the media access units and the quality metadata to a media content player of the UE 220. The media content player can be configured to initiate playback of the media access units. The quality metadata can be provided to the media content player (e.g., a DASH MPEG-2 media player). The media player can use the quality metadata in deciding which media content frames to request going forward and how to adapt the streaming media content going forward. In one example, the media player can adapt a media content bitrate, a resolution or a frame rate based on the quality metadata.

In one example, the media player of the UE 220 can request media content frames that have an increased quality level (albeit at a higher bitrate). In another example, if the quality metadata indicates that the quality level for the media content frames is relatively high, the media player can request media content frames at a slightly lower quality level (which can result in a reduced bitrate), such that the reduced quality level is not substantially noticeable to the UE's user. In other words, if a reduction of quality is not noticeable to the user, then media content frames at a reduced quality level can be selected in order to save bandwidth. Therefore, the use of quality metadata at the media player can enable the UE to intelligently request the media content frames for playback.

In one configuration, the quality access unit and the media access unit can be in accordance with a defined timing relationship. A quality metadata can share a same media timeline with associated media access units. The quality metadata can be associated with one or more video frames. The quality access unit can be decoded, and decoded information can be made available to the UE 220 before the corresponding media access unit is fetched from the network element 210. Such a timing relationship can guarantee that the quality metadata within the quality access u nit is made available to the UE 220 with sufficient lead time relative to a request time and presentation time stamp (PTS) of an associated media access unit. The PTS of the media access unit and the PTS of the quality access unit can be identical. The quality access unit can be transmitted in the transport stream with a sufficient lead time, such that suitable media adaptations (e.g., bitrate, resolution, frame rate) can be performed in advance of the presentation time of the associated media access unit.

Figure 3:
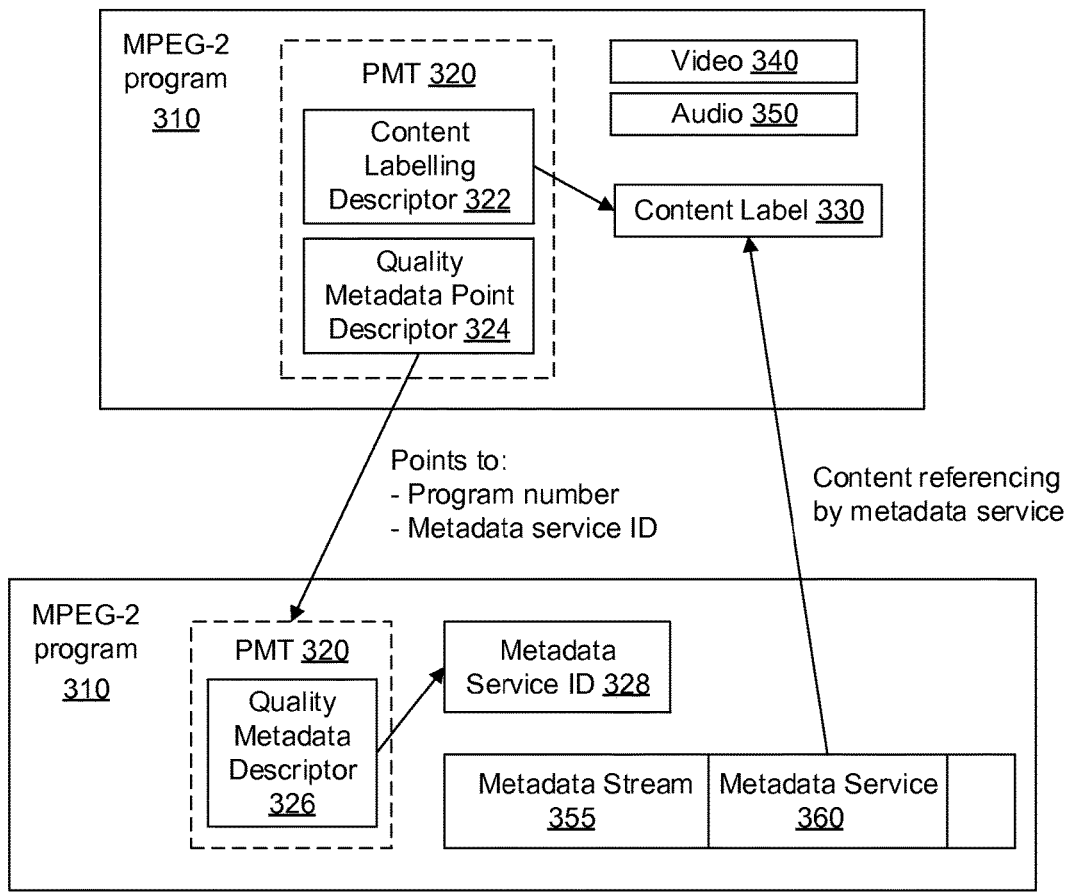
FIG. 3 illustrates carriage of quality metadata over an Moving Picture Experts Group (MPEG)-2 transport stream (TS) in accordance with an example.

FIG. 3 illustrates carriage of quality metadata over an Moving Picture Experts Group (MPEG)-2 transport stream (TS). FIG. 3 illustrates an MPEG-2 program 310 with associated metadata. The MPEG-2 310 program can be associated with audio 322 and video 324. The MPEG-2 program 310 can be described by a program map table (PMT) 320, which has a unique packet identifier (PID). The elementary streams that are associated with the MPEG-2 program 310 can have PIDs that are listed in the PMT 320. The PMT 320 can include a content labeling descriptor 322 and a quality metadata pointer descriptor 324. The content labeling descriptor 322 can point to a content label 330. The content label 330 can be referenced by a metadata service 360. The quality metadata pointer descriptor 324 can be point to a quality metadata descriptor 326. The quality metadata descriptor 326 in the PMT 320 can also be referred to as a quality extension descriptor. The quality metadata descriptor 326 can point to a metadata service ID 328. The MPEG-2 program 310 can include a metadata stream 355. The metadata stream 355 can include quality metadata for one or more frames in the video 340. Therefore, the video 340, audio 350 and the metadata stream 355 (e.g., which contains the quality metadata) can be multiplexed in the MPEG-2 program 310.

Figure 4:
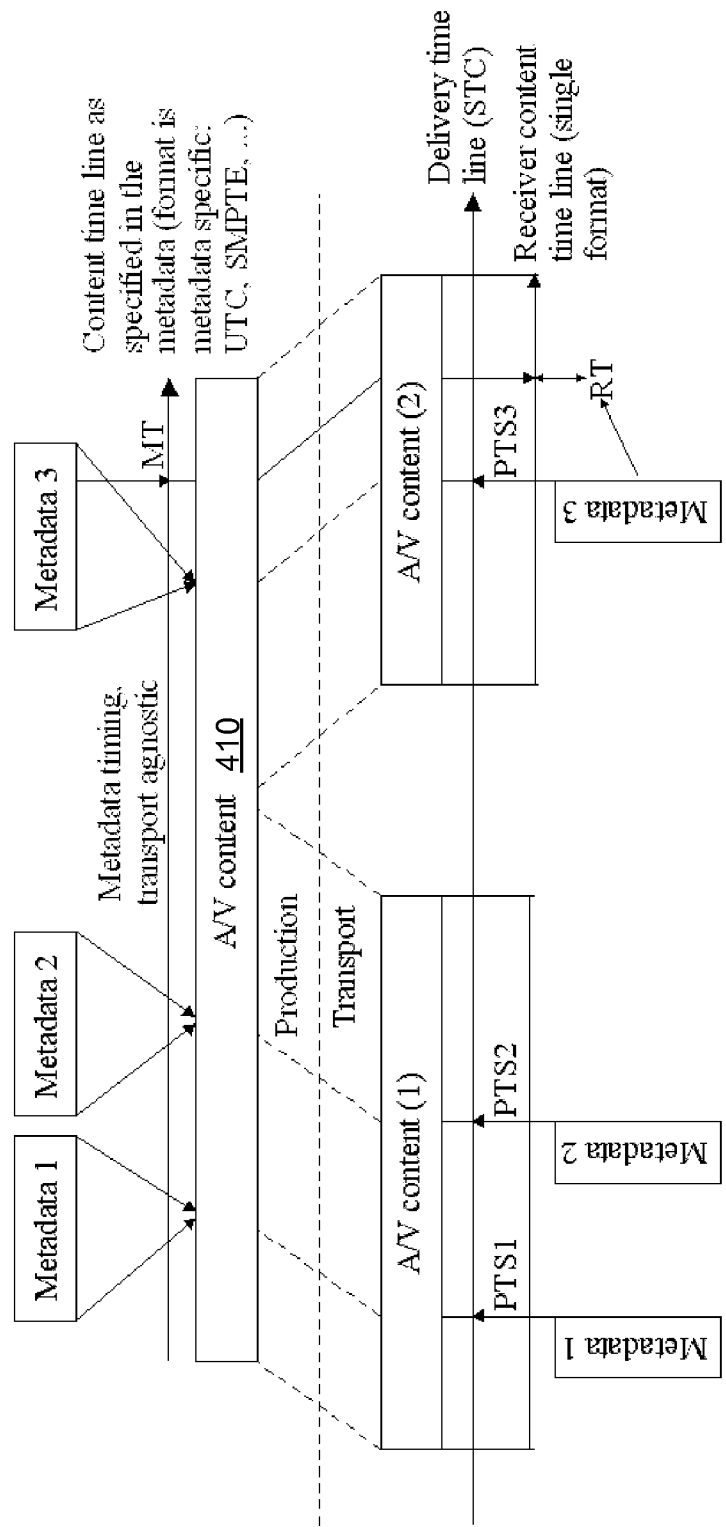
FIG. 4 illustrates a delivery of quality metadata in a Moving Picture Experts Group (MPEG)-2 transport stream (TS) format in accordance with an example.

FIG. 4 illustrates a delivery of quality metadata in a Moving Picture Experts Group (MPEG)-2 transport stream (TS) format. The MPEG-2 TS can include audio and video (A/V) content 410. The A/V content 410 can be provided from a network element to a user equipment (UE). While the A/V content 410 is being provided to the UE, metadata (e.g., quality metadata) can be periodically sent with the A/V content 410. In one example, the A/V content 410 can include a first packet time stamp (PTS1) that is associated with a first quality metadata, a second packet time stamp (PTS2) that is associated with a second quality metadata, and a third packet time stamp (PTS3) that is associated with a third quality metadata. In other words, a packet time stamp can be substantially identical to a corresponding quality metadata. The UE can receive the A/V content 410, as well as the quality metadata associated with the A/V content 410, and can adaptively stream the A/V content 410 based on the quality metadata. For example, the UE can request an increased bitrate or a decreased bitrate based on the quality metadata that is received in the MEPG-2 TS.

FIG. 5 is an exemplary table of identifier (ID) assignment values. The ID assignment values for MPEG2-TS formats can be included in Table 2-31 of ISO/IEC 13818-1. In one example, the table can include a value of 0x0A and an associated description of "ISO/IEC 23001-10 (Quality Access Unit) section".

In one configuration, Table 2-34 of ISO/IEC 13818-1 (not shown in FIG. 5) can include a value of 0x2C and an associated description of "Quality Stream access units carried in sections". In addition, Table 2-34 of ISO/IEC 13818-1 can include a value of 0x2D-0x7E and an associated description of "ITU-T Rec. H.222.0 |ISO/IEC 13818-1 reserved".

In one configuration, Table T-1 of ISO/IEC 13818-1 (not shown in FIG. 5) can include 'codecs' parameter values. As an example, a stream type identified as 0x2C can be associated with an element identified as "Vqme".

FIG. 6 is an exemplary table of extension descriptors. The extension descriptors can be included in Table 2-103bis in Clause 2.6.90 of ISO/IEC 13818-1. The table can include a quality extension descriptor that is noted as Quality_extension_descriptor( ).

FIG. 7 is an exemplary table of extension descriptor tag values. The extension descriptor tag values can be included in Table 2-103ter in Clause 2.6.91 of ISO/IEC 13818-1. The table can include a quality extension descriptor, also referred to as Quality_extension_descriptor( ). The quality extension descriptor can be associated with an extension descriptor tag value of 9. The quality extension descriptor can be applicable to a transport stream (TS) and not applicable to a packet stream (PS). In addition, the structure of the quality extension descriptor can be defined in ISO/IEC 13818-1 Clauses 2.6.104 and 2.6.105.

FIG. 8 illustrates an exemplary transcoder 810 configured to receive an International Organization for Standardization (ISO) base media file format (ISOBMFF) file or an MPEG-2 TS file as input and provide quality metadata for MPEG-2 TS or quality metadata for an ISOBMFF file as an output. In one example, the transcoder 810 can receive the ISOBMFF file, decode the ISOBMFF file, and translate quality metadata in the ISOBMFF file in order to generate the quality metadata for the MPEG-2 TS. In other words, the quality metadata extracted from the ISOBMFF file can be used for the MPEG-2 TS. In another example, the transcoder 810 can receive an MPEG-2 TS file, decode the MPEG-2 TS file, and translate quality metadata in the MPEG-2 TS file in order to generate quality metadata to be communicated using the ISOBMFF file. In other words, the quality metadata extracted from the MPEG-2 TS file can be used for the ISOBMFF file. The quality metadata to be communicated over the ISOBMFF file can be associated with an MPEG-2 TS based media content stream representation, wherein the quality metadata includes quality metric values for one or more media content frames in the MPEG-2 TS based media content stream representation.

FIG. 9 illustrates an exemplary abstract syntax notation (ASN) code example of a dynamic adaptive streaming over hypertext transfer protocol (DASH) media presentation description (MPD) file. The carriage of quality information based on a an Moving Picture Experts Group (MPEG)-2 transport stream (TS) format can be signaled via a codecs parameter (or @codecs parameter) in the DASH MPD file. The codecs parameter can indicate a value of "vqme.psnr". In this example, the video quality metrics can be based on peak signal to noise ratio (PSNR). A complete set of codec names for different video quality metrics and associated metadata can be found in ISO/IEC 23001-10.

Figure 10:
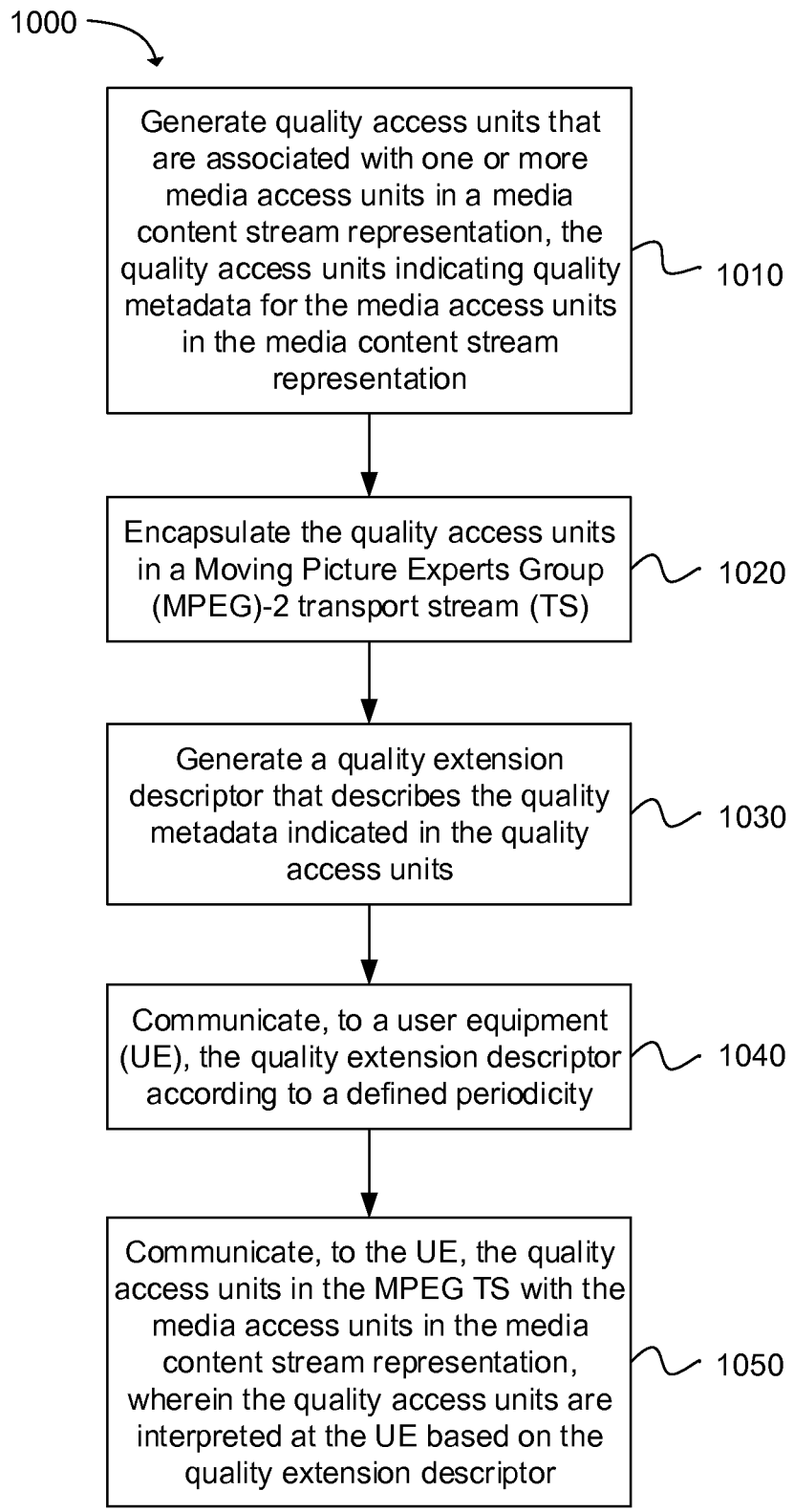
FIG. 10 depicts functionality of a network element operable to communicate Moving Picture Experts Group (MPEG)-2 streaming video quality information in accordance with an example.

Another example provides functionality 1000 of a network element operable to communicate Moving Picture Experts Group (MPEG)-2 streaming video quality information, as shown in the flow chart in FIG. 10. The functionality can be implemented as a method or the functionality can be executed as instructions on a machine, where the instructions are included on at least one computer readable medium or one non-transitory machine readable storage medium. The network element can comprise one or more processors configured to generate quality access units that are associated with one or more media access units in a media content stream representation, the quality access units indicating quality metadata for the media access units in the media content stream representation, as in block 1010. The one or more processors can be configured to encapsulate the quality access units in a Moving Picture Experts Group (MPEG)-2 transport stream (TS), as in block 1020. The one or more processors can be configured to generate a quality extension descriptor that describes the quality metadata indicated in the quality access units, as in block 1030. The one or more processors can be configured to communicate, to a user equipment (UE), the quality extension descriptor according to a defined periodicity, as in block 1040. The one or more processors can be configured to communicate, to the UE, the quality access units in the MPEG TS with the media access units in the media content stream representation, wherein the quality access units are interpreted at the UE based on the quality extension descriptor, as in block 1050.

In one configuration, a first processor can perform the operations in blocks 1010, 1020 and/or 1030. The first processor can be a single processor, or alternatively, the first processor can be comprised of one or more separate processors. In one configuration, a second processor can perform the operations in blocks 1040 and/or 1050. One example of the second processor is a baseband processor.

In one example, the quality access units in the MPEG TS and the media access units are communicated to the UE to enable the UE to parse the MPEG TS using the quality extension descriptor to extract the quality access units, decode the quality access units and present the media access units based on the quality access units. In another example, the quality metadata includes at least one of the following quality metric values: a peak signal to noise ratio (PSNR); a structural similarity index (SSIM); a multi-scale structural similarity index (MS-SSIM); a video quality metric (VQM); a perceptual evaluation of video quality (PEVQ); a mean opinion score (MOS); or a frame significance (FSIG).

In one example, the quality extension descriptor includes at least one of: a number of quality metric values in each quality access unit; a constant size for quality metric values in each quality access unit; a code name for quality metric values in the quality access units; or a stream identifier for the media content stream representation that is described by the quality access units. In another example, the one or more processors are further configured to: send multiple quality extension descriptors and associated quality access units that correspond to multiple media content stream representations using a single MPEG-2 TS.

In one example, each quality access unit includes at least one of: a number of quality metric values; a size of a quality metric sample field; a code name for the quality metric values; a number of quality metric samples per quality metric value; or a decoding time stamp (DTS) of the media access unit that is described by a quality metric sample. In another example, the one or more processors are further configured to use a transcoder to parse an International Organization for Standardization (ISO) base media file format (ISOBMFF) file, decode the ISOBMFF file, and translate quality metadata in the ISOBMFF file in order to generate the quality metadata for the MPEG-2 TS.

In one example, the one or more processors are further configured to use a transcoder to parse an MPEG-2 TS file, decode the MPEG-2 TS file, and translate quality metadata in the MPEG-2 TS file in order to generate quality metadata to be communicated from the network element over an International Organization for Standardization (ISO) base media file format (ISOBMFF) file. In another example, the quality metadata to be communicated over the ISOBMFF file is associated with an MPEG-2 TS based media content stream representation, wherein the quality metadata includes quality metric values for one or more media content frames in the MPEG-2 TS based media content stream representation.

In one example, the quality extension descriptor is included in a program map table (PMT) and is communicated to the UE approximately every 100 milliseconds (ms). In another example, the media access units are media content frames (e.g., media content frames) in the media content stream representation. In yet another example, presentation time stamps of the quality access units are substantially identical to presentation time stamps of the media access units.

Figure 11:
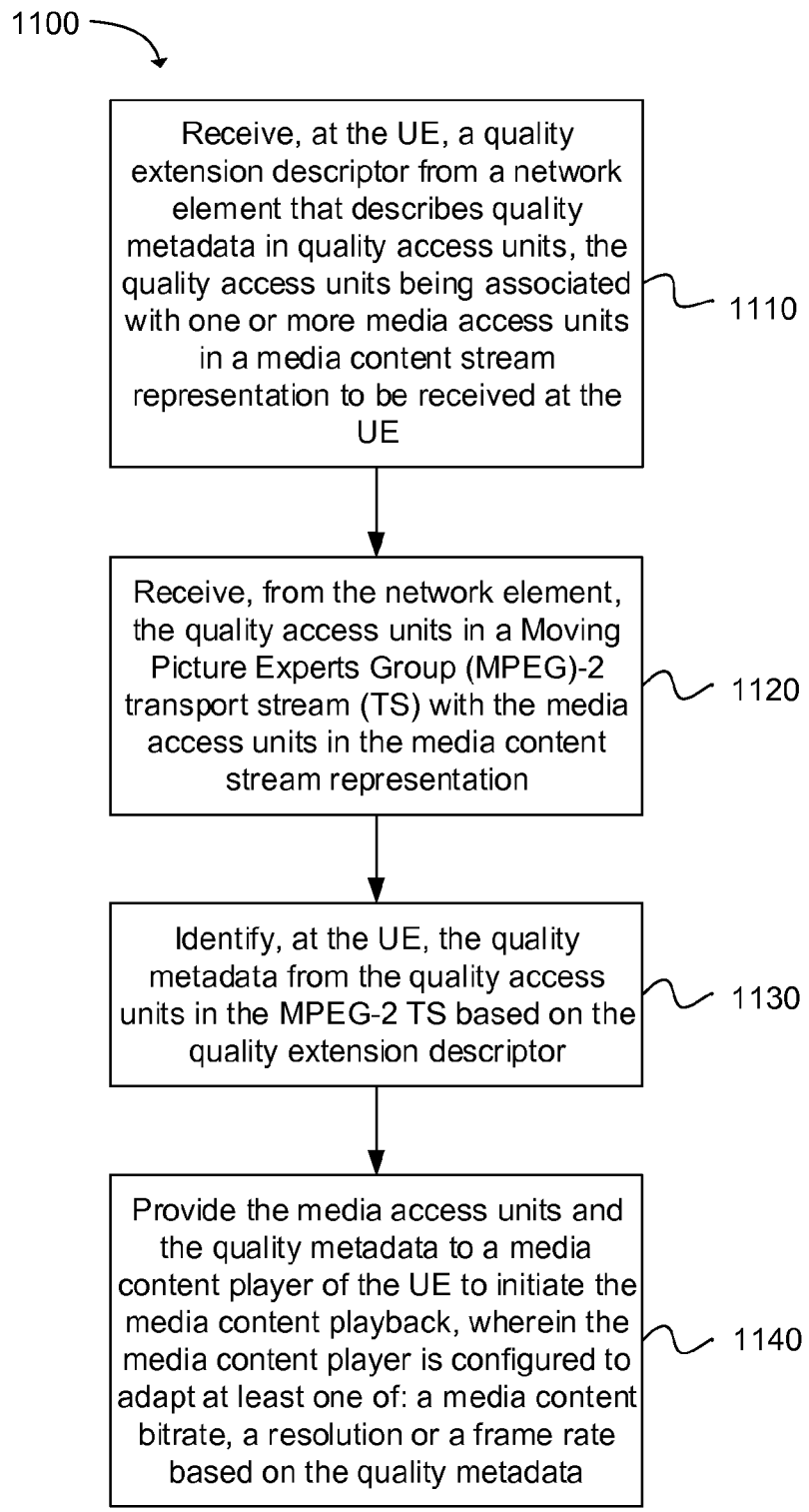
FIG. 11 depicts functionality of a user equipment (UE) operable to perform media content playback using media content quality information in accordance with an example.

Another example provides functionality 1100 of a user equipment (UE) operable to perform media content playback using media content quality information, as shown in the flow chart in FIG. 11. The functionality can be implemented as a method or the functionality can be executed as instructions on a machine, where the instructions are included on at least one computer readable medium or one non-transitory machine readable storage medium. The UE can comprise one or more processors configured to receive, at the UE, a quality extension descriptor from a network element that describes quality metadata in quality access units, the quality access units being associated with one or more media access units in a media content stream representation to be received at the UE, as in block 1110. The one or more processors can be configured to receive, from the network element, the quality access units in a Moving Picture Experts Group (MPEG)-2 transport stream (TS) with the media access units in the media content stream representation, as in block 1120. The one or more processors can be configured to identify, at the UE, the quality metadata from the quality access units in the MPEG-2 TS based on the quality extension descriptor, as in block 1130. The one or more processors can be configured to provide the media access units and the quality metadata to a media content player of the UE to initiate the media content playback, wherein the media content player is configured to adapt at least one of: a media content bitrate, a resolution or a frame rate based on the quality metadata, as in block 1140.

In one configuration, a first processor can perform the operations in blocks 1110 and/or 1120. One example of the first processor is a baseband processor. In one configuration, a second processor can perform the operations in blocks 1130 and/or 1140. The second processor can be a single processor, or alternatively, the second processor can be comprised of one or more separate processors.

In one example, the quality metadata includes at least one of the following quality metric values: a peak signal to noise ratio (PSNR); a structural similarity index (SSIM); a multi-scale structural similarity index (MS-SSIM); a video quality metric (VQM); a perceptual evaluation of video quality (PEVQ); a mean opinion score (MOS); or a frame significance (FSIG). In another example, the quality extension descriptor includes at least one of: a number of quality metric values in each quality access unit; a constant size for quality metric values in each quality access unit; a code name for quality metric values in the quality access units; or a stream identifier for the media content stream representation that is described by the quality access units.

In one example, the one or more processors are further configured to: receive multiple quality extension descriptors and associated quality access units that correspond to multiple media content stream representations in a single MPEG-2 TS. In another example, each quality access unit includes at least one of: a number of quality metric values; a size of a quality metric sample field; a code name for the quality metric values; a number of quality metric samples per quality metric value; or a decoding time stamp (DTS) of the media access unit that is described by a quality metric sample.

Figure 12:
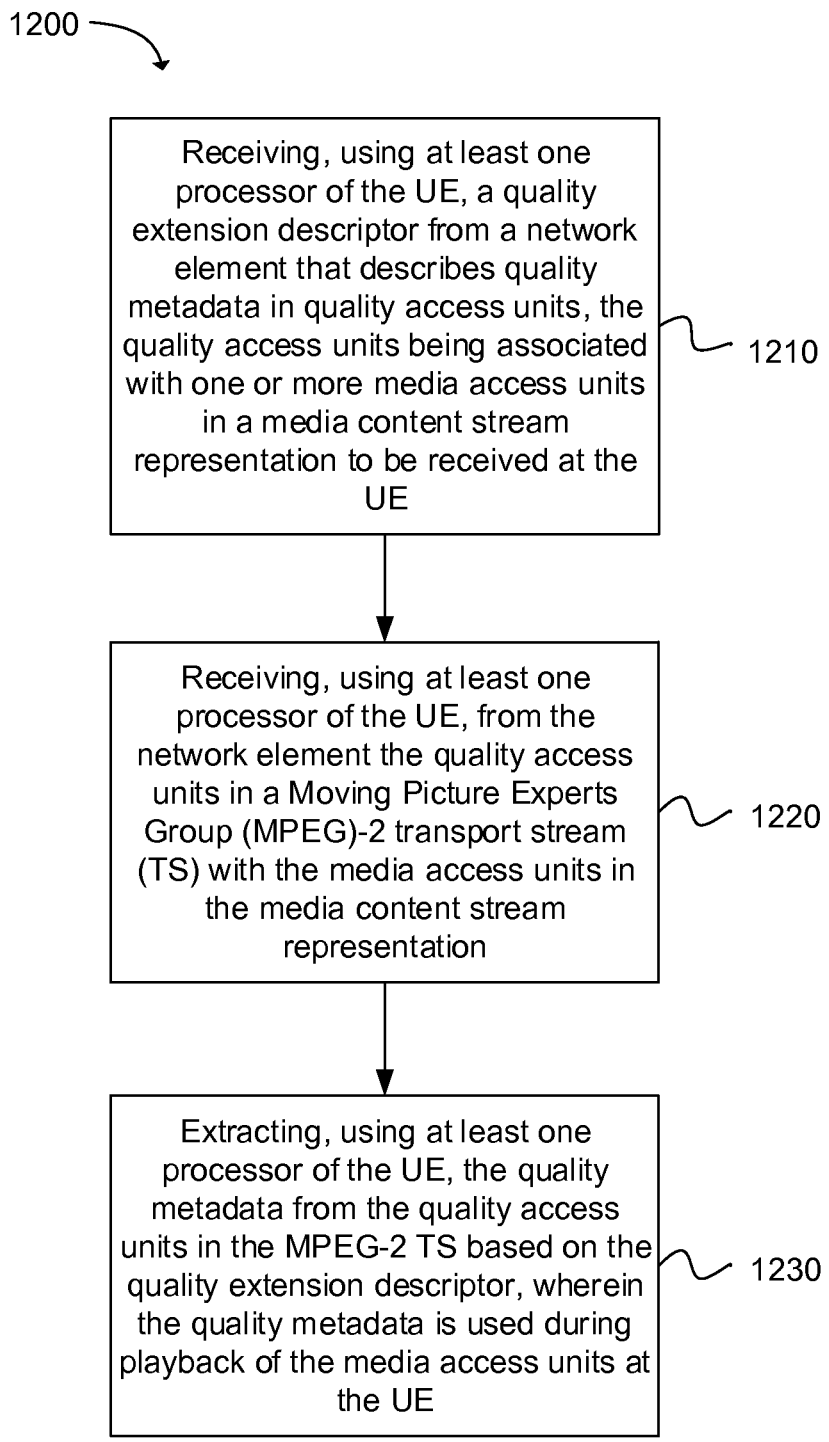
FIG. 12 depicts a flow chart of at least one non-transitory machine readable storage medium having instructions embodied thereon for receiving Moving Picture Experts Group (MPEG)-2 streaming video quality information at a user equipment (UE) in accordance with an example.

Another example provides functionality 1200 of at least one non-transitory machine readable storage medium having instructions embodied thereon for receiving Moving Picture Experts Group (MPEG)-2 streaming video quality information at a user equipment (UE), as shown in the flow chart in FIG. 12. The instructions, when executed, can cause the UE to perform receiving, using at least one processor of the UE, a quality extension descriptor from a network element that describes quality metadata in quality access units, the quality access units being associated with one or more media access units in a media content stream representation to be received at the UE, as in block 1210. The instructions, when executed, can cause the UE to perform receiving, using at least one processor of the UE, from the network element the quality access units in a Moving Picture Experts Group (MPEG)-2 transport stream (TS) with the media access units in the media content stream representation, as in block 1220. The instructions, when executed, can cause the UE to perform extracting, using at least one processor of the UE, the quality metadata from the quality access units in the MPEG-2 TS based on the quality extension descriptor, wherein the quality metadata is used during playback of the media access units at the UE, as in block 1230.

In one example, the at least one non-transitory machine readable storage can further comprise instructions which when executed by the at least one processor of the UE, cause the UE to perform the following: providing the media access units and the quality metadata to a media content player of the UE to initiate the playback of the media access units, wherein the media content player is configured to adapt at least one of: a media content bitrate, a resolution or a frame rate based on the quality metadata.

Figure 13:
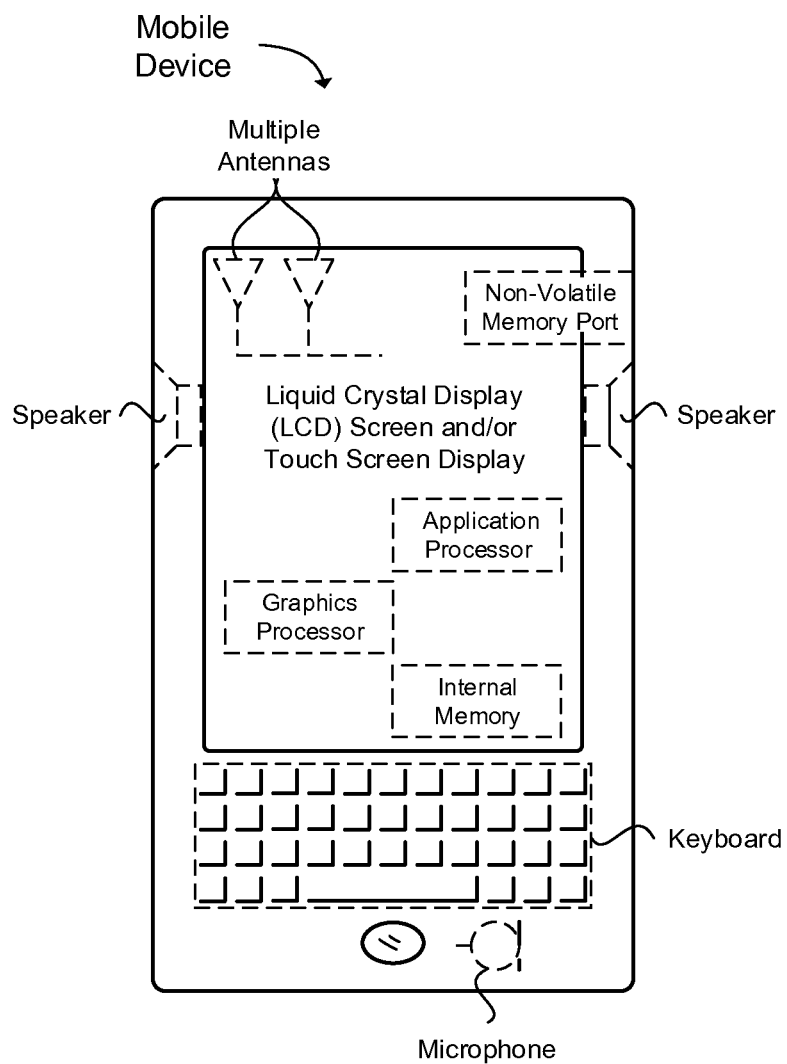
FIG. 13 illustrates a diagram of a wireless device (e.g., UE) in accordance with an example.

In one example, the quality extension descriptor is received at the UE from the network approximately every 100 milliseconds (ms), wherein the quality extension descriptor is included in a program map table (PMT). In another example, the at least one non-transitory machine readable storage medium can further comprise instructions which when executed by the at least one processor of the UE, cause the UE to perform the following: decoding, at the UE, a quality access unit before a corresponding media access unit is fetched from the network element FIG. 13 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 13 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The node and wireless device can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits can be used to implement the functional units described in this specification. For example, a first hardware circuit can be used to perform processing operations and a second hardware circuit (e.g., a transceiver) can be used to communicate with other entities. The first hardware circuit and the second hardware circuit can be integrated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A network element operable to communicate Moving Picture Experts Group (MPEG)-2 streaming video quality information, the network element comprising one or more processors and memory configured to:
   generate quality access units that are associated with one or more media access units in a media content stream representation, the quality access units indicating quality metadata for the media access units in the media content stream representation;
   encapsulate the quality access units in a Moving Picture Experts Group (MPEG)-2 transport stream (TS);
   generate an MPEG-2 TS quality extension descriptor that describes the quality metadata indicated in the quality access units;
   communicate, to a user equipment (UE), the MPEG-2 TS quality extension descriptor according to a defined periodicity; and
   communicate, to the UE, the quality access units in the MPEG-2-TS with the media access units in the media content stream representation, wherein the quality access units are interpreted at the UE based on the MPEG-2 TS quality extension descriptor.

2. The network element of claim 1, wherein the quality access units in the MPEG TS and the media access units are communicated to the UE to enable the UE to parse the MPEG TS using the MPEG-2 TS quality extension descriptor to extract the quality access units, decode the quality access units and present the media access units based on the quality access units.

3. The network element of claim 1, wherein the quality metadata includes at least one of the following quality metric values:
   a peak signal to noise ratio (PSNR);
   a structural similarity index (SSIM);
   a multi-scale structural similarity index (MS-SSIM);
   a video quality metric (VQM);
   a perceptual evaluation of video quality (PEVQ);
   a mean opinion score (MOS); or
   a frame significance (FSIG).

4. The network element of claim 1, wherein the MPEG-2 TS quality extension descriptor includes at least one of:
   a number of quality metric values in each quality access unit;
   a constant size for quality metric values in each quality access unit;
   a code name for quality metric values in the quality access units; or
   a stream identifier for the media content stream representation that is described by the quality access units.

5. The network element of claim 1, wherein the one or more processors are further configured to: send multiple MPEG-2 TS quality extension descriptors and associated quality access units that correspond to multiple media content stream representations using a single MPEG-2 TS.

6. The network element of claim 1, wherein each quality access unit includes at least one of:
   a number of quality metric values;
   a size of a quality metric sample field;
   a code name for the quality metric values;
   a number of quality metric samples per quality metric value; or
   a decoding time stamp (DTS) of the media access unit that is described by a quality metric sample.

7. The network element of claim 1, wherein the one or more processors are further configured to use a transcoder to parse an International Organization for Standardization (ISO) base media file format (ISOBMFF) file, decode the ISOBMFF file, and translate quality metadata in the ISOBMFF file in order to generate the quality metadata for the MPEG-2 TS.

8. The network element of claim 1, wherein the one or more processors are further configured to use a transcoder to parse an MPEG-2 TS file, decode the MPEG-2 TS file, and translate quality metadata in the MPEG-2 TS file in order to generate quality metadata to be communicated from the network element over an International Organization for Standardization (ISO) base media file format (ISOBMFF) file.

9. The network element of claim 8, wherein the quality metadata to be communicated over the ISOBMFF file is associated with an MPEG-2 TS based media content stream representation, wherein the quality metadata includes quality metric values for one or more media content frames in the MPEG-2 TS based media content stream representation.

10. The network element of claim 1, wherein the MPEG-2 TS quality extension descriptor is included in a program map table (PMT) and is communicated to the UE every 100 milliseconds (ms).

11. The network element of claim 1, wherein the media access units are media content frames in the media content stream representation.

12. The network element of claim 1, wherein presentation time stamps of the quality access units are identical to presentation time stamps of the media access units.

13. A user equipment (UE) operable to perform media content playback using media content quality information, the UE comprising one or more processors and memory configured to:
   receive, at the UE, an MPEG-2 TS quality extension descriptor from a network element that describes quality metadata in quality access units, the quality access units being associated with one or more media access units in a media content stream representation to be received at the UE;
   receive, from the network element, the quality access units in a Moving Picture Experts Group (MPEG)-2 transport stream (TS) with the media access units in the media content stream representation;
   identify, at the UE, the quality metadata from the quality access units in the MPEG-2 TS based on the MPEG-2 TS quality extension descriptor; and
   provide the media access units and the quality metadata to a media content player of the UE to initiate the media content playback, wherein the media content player is configured to adapt at least one of: a media content bitrate, a resolution or a frame rate based on the quality metadata.

14. The UE of claim 13, wherein the quality metadata includes at least one of the following quality metric values:

a peak signal to noise ratio (PSNR);
a structural similarity index (SSIM);
a multi-scale structural similarity index (MS-SSIM);
a video quality metric (VQM);
a perceptual evaluation of video quality (PEVQ);
a mean opinion score (MOS); or
a frame significance (FSIG).

15. The UE of claim 13, wherein the MPEG-2 TS quality extension descriptor includes at least one of:
   a number of quality metric values in each quality access unit;
   a constant size for quality metric values in each quality access unit;
   a code name for quality metric values in the quality access units; or
   a stream identifier for the media content stream representation that is described by the quality access units.

16. The UE of claim 13, wherein the one or more processors are further configured to: receive multiple MPEG-2 TS quality extension descriptors and associated quality access units that correspond to multiple media content stream representations in a single MPEG-2 TS.

17. The UE of claim 13, wherein each quality access unit includes at least one of:
   a number of quality metric values;
   a size of a quality metric sample field;
   a code name for the quality metric values;
   a number of quality metric samples per quality metric value; or
   a decoding time stamp (DTS) of the media access unit that is described by a quality metric sample.

18. At least one non-transitory machine readable storage medium having instructions embodied thereon for receiving Moving Picture Experts Group (MPEG)-2 streaming video quality information at a user equipment (UE), the instructions when executed cause the UE to perform the following:
   receiving, using at least one processor of the UE, an MPEG-2 TS quality extension descriptor from a network element that describes quality metadata in quality access units, the quality access units being associated with one or more media access units in a media content stream representation to be received at the UE;
   receiving, using at least one processor of the UE, from the network element the quality access units in a Moving Picture Experts Group (MPEG)-2 transport stream (TS) with the media access units in the media content stream representation; and
   extracting, using at least one processor of the UE, the quality metadata from the quality access units in the MPEG-2 TS based on the MPEG-2 TS quality extension descriptor, wherein the quality metadata is used during playback of the media access units at the UE.

19. The at least one non-transitory machine readable storage medium of claim 18, further comprising instructions which when executed by the at least one processor of the UE, cause the UE to perform the following: providing the media access units and the quality metadata to a media content player of the UE to initiate the playback of the media access units, wherein the media content player is configured to adapt at least one of: a media content bitrate, a resolution or a frame rate based on the quality metadata.

20. The at least one non-transitory machine readable storage medium of claim 18, wherein the MPEG-2 TS quality extension descriptor is received at the UE from the network every 100 milliseconds (ms), wherein the quality extension descriptor is included in a program map table (PMT).

21. The at least one non-transitory machine readable storage medium of claim 18, further comprising instructions which when executed by the at least one processor of the UE, cause the UE to perform the following: decoding, at the UE, a quality access unit before a corresponding media access unit is fetched from the network element.

* * * * *